United States Patent [19]

Mason

[11] 4,246,444
[45] * Jan. 20, 1981

[54] TELEPHONE HANDSET ACOUSTIC COUPLING CUP

[75] Inventor: Roy G. Mason, Sunnyvale, Calif.

[73] Assignee: Anderson Jacobson, Inc., San Jose, Calif.

[*] Notice: The portion of the term of this patent subsequent to Jun. 12, 1996, has been disclaimed.

[21] Appl. No.: 6,731

[22] Filed: Jan. 26, 1979

Related U.S. Application Data

[63] Continuation-in-part of Ser. No. 857,090, Dec. 5, 1977, Pat. No. 4,158,106.

[30] Foreign Application Priority Data

Nov. 30, 1978 [JP] Japan .................................. 53-147299

[51] Int. Cl.³ .......................................... H04M 11/00
[52] U.S. Cl. .................................................. 179/2 C
[58] Field of Search ................................ 179/1 C, 2 C

[56] References Cited

U.S. PATENT DOCUMENTS

| 3,449,522 | 6/1969 | Crane et al. .......................... 179/1 C |
| 4,158,106 | 6/1979 | Mason .................................. 179/2 C |

FOREIGN PATENT DOCUMENTS 1013279 4/1952 France ..................................... 179/1 C

OTHER PUBLICATIONS

"The Coupler II", Communications Logic, Inc., Houston, Texas, Dec. 10, 1970.

*Primary Examiner*—Konick, Bernard
*Assistant Examiner*—Joseph A. Popek
*Attorney, Agent, or Firm*—Limbach, Limbach & Sutton

[57] ABSTRACT

A telephone handset acoustic coupling cup adapted for use as part of an acoustic data coupler wherein the cup has a flexible, gripping lip surrounding an opening for receiving a telephone handset transmitter or receiver case. Each of two acoustic coupling cups may additionally be eccentrically rotatably mounted on a case in a manner that their openings may be varied in distance from one another by rotating the cups with respect to the case. The cups may also be flexible in a manner to be bendable with respect to said case, all with the view of providing an acoustic data coupler that can accept a wide variety of different sizes and shapes of telephone handsets.

4 Claims, 12 Drawing Figures

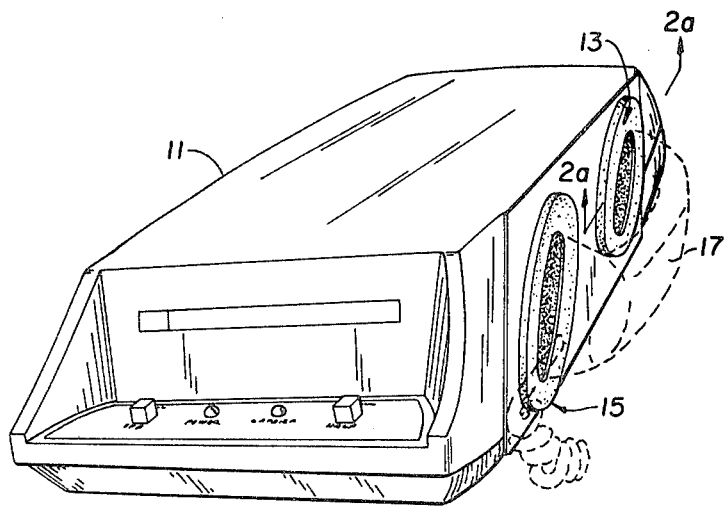
FIG.__1.
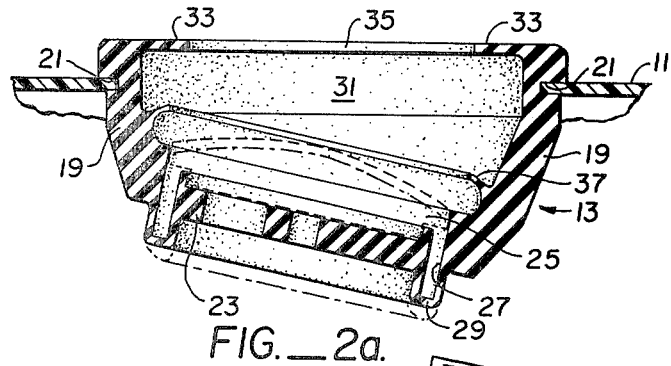
FIG.__2a.
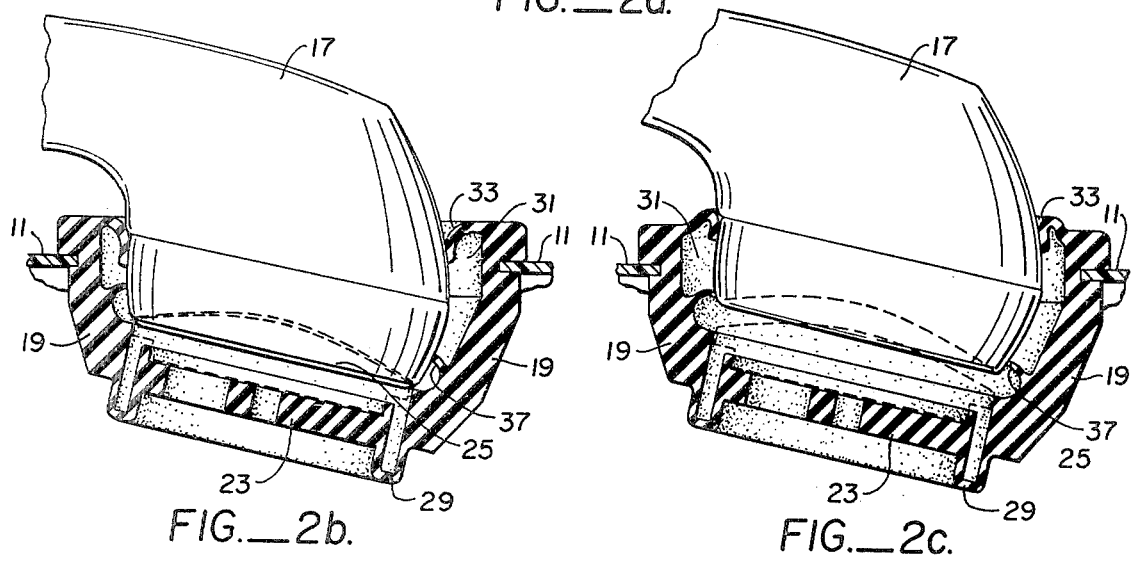
FIG.__2b.     FIG.__2c.

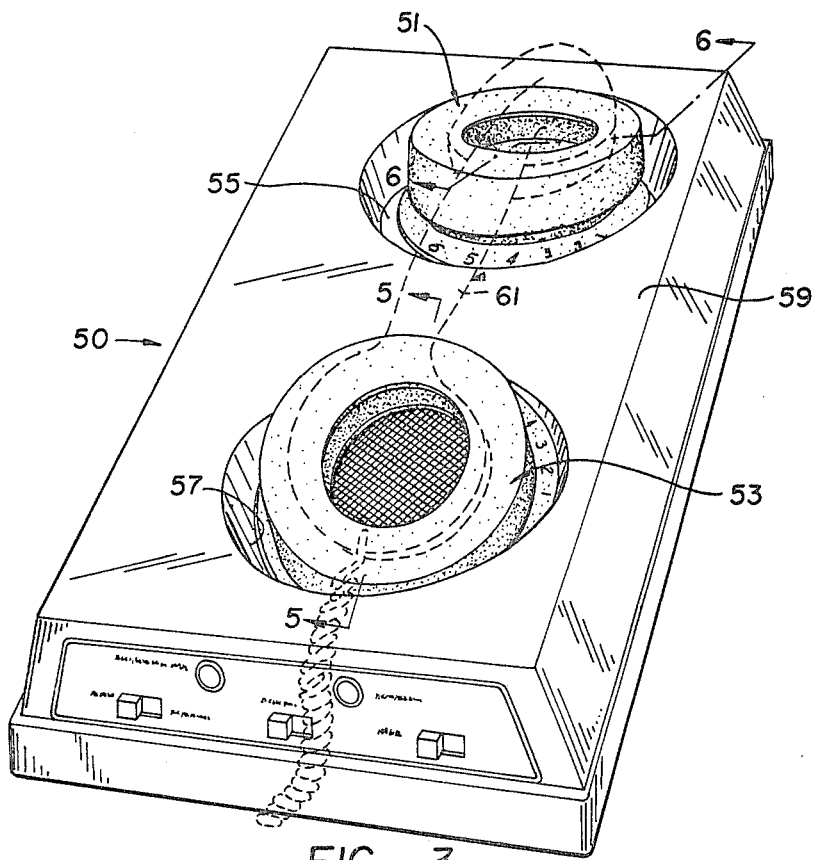
FIG._3.
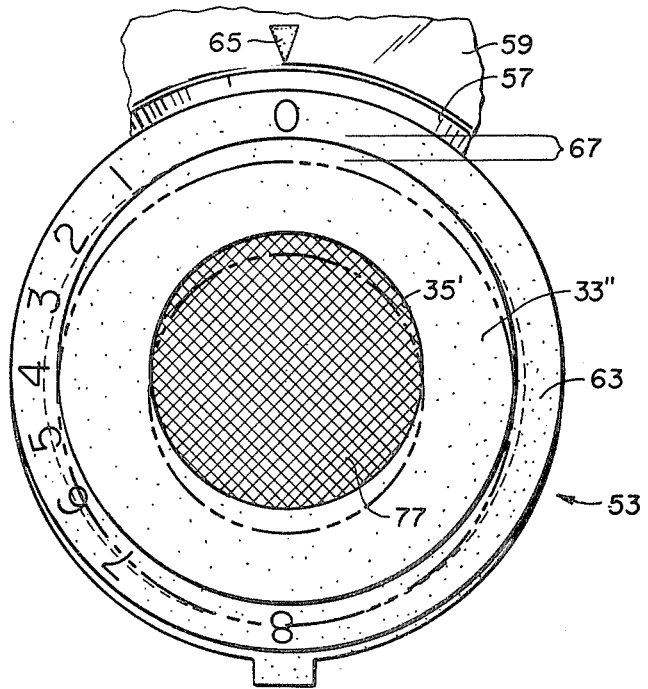
FIG._4.

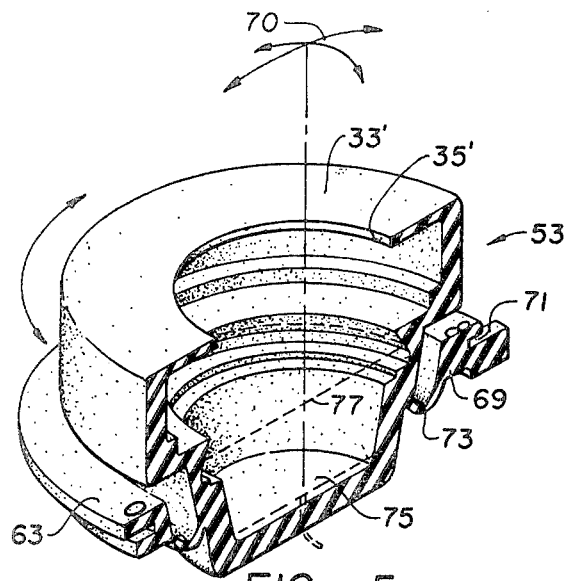
FIG._5.
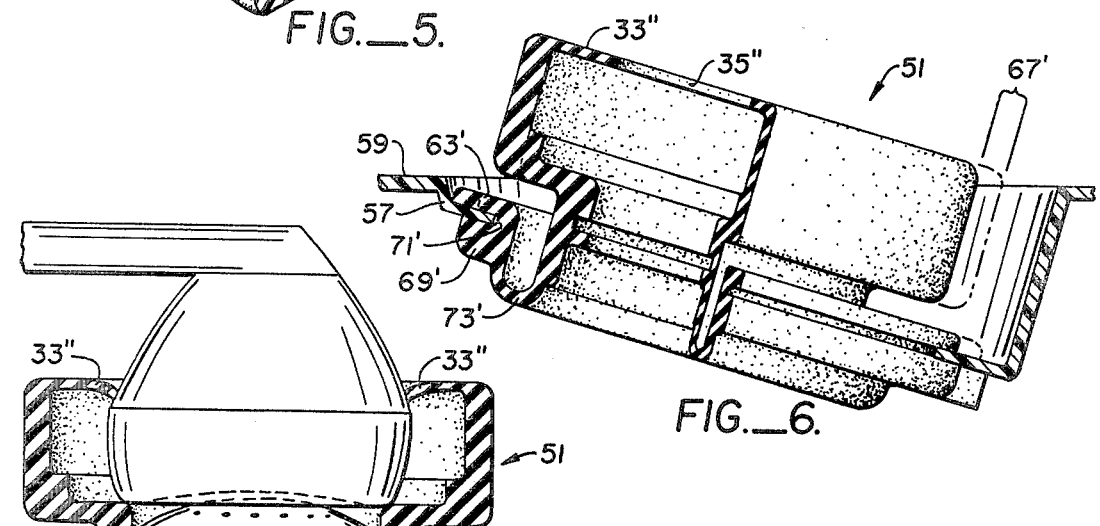
FIG._6.
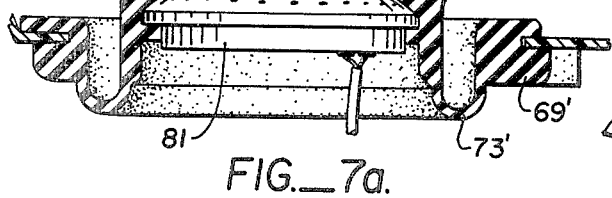
FIG._7a.
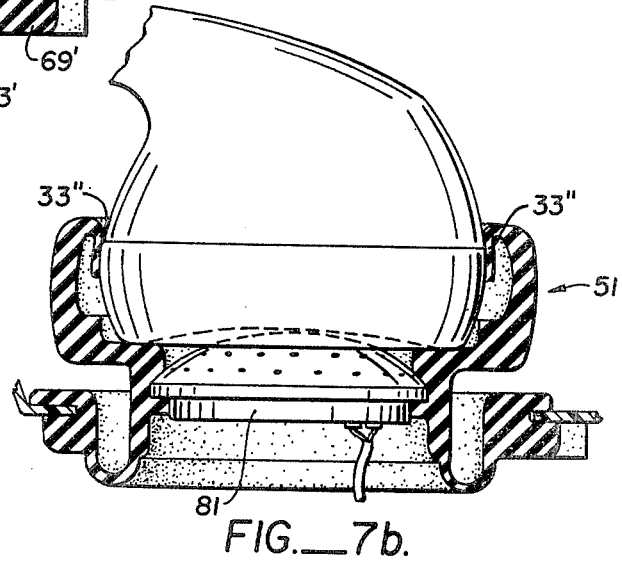
FIG._7b.

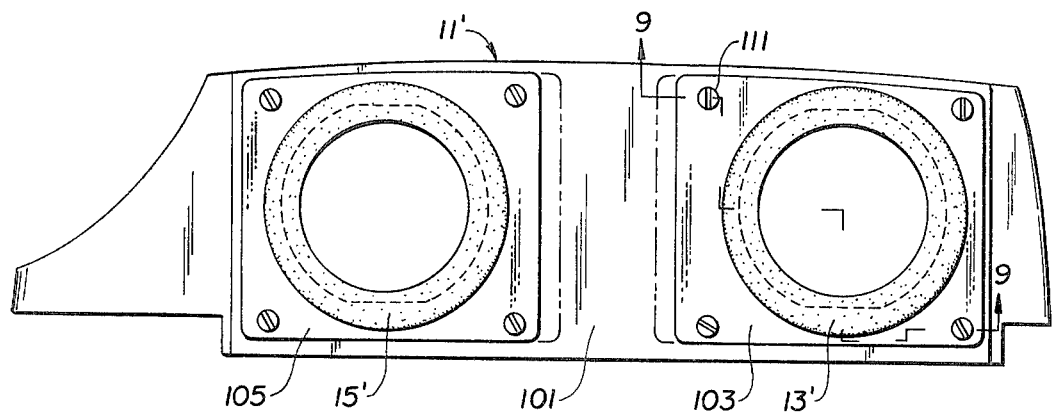
FIG._8.
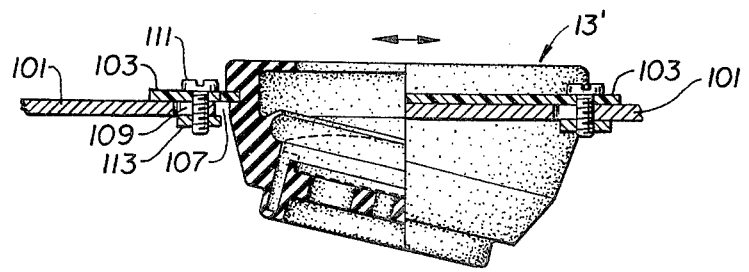
FIG._9.

4,246,444

TELEPHONE HANDSET ACOUSTIC COUPLING CUP

CROSS-REFERENCE TO RELATED APPLICATION

This application is a continuation-in-part of co-pending patent application Ser. No. 857,090, filed Dec. 5, 1977, now U.S. Pat. No. 4,158,106.

BACKGROUND OF THE INVENTION

This invention relates generally to acoustic data couplers, and particularly to the design of receiver and transmitter element containing cups thereon for establishing a mechanical and acoustical coupling with telephone handsets of various sizes.

Data couplers are becoming widely used as a means for connecting computer equipment to an ordinary telephone line through a telephone handset. Such a coupler generally contains audio transmitter and receiving elements on its case with the elements being electrically connected therein so that computing equipment can both receive and transmit computer data over an ordinary telephone line. The telephone line is connected to the receiving and transmitting elements by placing a handset of an ordinary telephone in close contact therewith. In order to maintain the contact and also exclude some background noise from interferring with the data transmission, acoustic coupling cups are utilized at each of the transmitter and receiver elements for contacting the handset. Existing couplers of this type are exemplified by the following U.S. Pat. Nos.: 3,553,374—Wolf (1971); 3,585,302—Swan (1971); 3,719,783—Kennedy (1973); 3,725,584—Kilmer et al (1973); 3,733,437—Keith (1973); and 3,992,583—Davis et al (1976).

It is a principal object of the present invention to provide an improved data coupler handset receiving cup that holds a handset in place on the data coupler with improved mechanical security, accepts a wider variation and sizes of handsets and which provides a close contact between the receiving and transmitting elements of the acoustic coupler and the handset being carried thereby.

SUMMARY OF THE INVENTION

These and additional objects are accomplished by the various aspects of the present invention, wherein, briefly, according to one aspect, a thin flexible resilient rubber-like lip is held by a cup structure and extends inward therefrom to form a circular opening. The lip has a free space beneath it within the cup so that when a handset piece having a diameter larger than the opening is pushed therethrough the lip opening attaches to the handset and stretches. As the handset is pushed into the opening the lip curls downward. This securely holds the handset in place and when it is attempted to pull it out of the cup there is a resilient holding force established by the curled lip. This tightness permits mounting of the handset on the side or bottom of a device without any further attachment device or clip being necessary. The tightness of the lip around the handset also provides an improved acoustic isolation of a receiver or transmitter element within from the surrounding background noise outside of the cup.

According to another aspect of the present invention, a receiver or transmitter element carried with a cup is mounted on a bottom portion that is resiliently urged upward to provide a close contact with a receiver or transmitter end of a telephone handset that may be placed into the cup. This is provided, in a preferred form, by supporting the bottom cup portion through a resilient lip of thin, flexible rubber-like material. This permits a simplified, unitary construction of the cup.

According to another aspect of the present invention, the cup is rotatably mounted on the housing in a manner that its axis of rotation is displaced from the center of the opening which receives the handset. The result is that the distance between openings can be varied by rotating one or both of the acoustical cups, thereby accepting different length handsets with the single acoustical coupler.

According to another aspect of the present invention, the portion of the cup that receives and contacts the handset is mounted to a base portion attached to the case through a resilient lip in an manner to permit tilting of the handset receiving cup portion with respect to the base portion of the cup. This feature provides an adjustment for handsets having different angular relationships and dimensions.

According to another aspect of the present invention, at least one of the cups is mounted on a plate that is adjustable with respect to the case in a direction toward and away from the other cup.

Each of the various aspects of the present invention summarized above may be combined into a single cup structure or provided as individual improvements in existing cup designs. Additional objects, advantages and features of the various aspects of the present invention will become apparent from the following detailed description of their preferred embodiments.

BRIEF DESCRIPTION OF THE DRAWINGS

FIG. 1 illustrates an acoustic data coupler having coupling cups according to one particular design;

FIGS. 2a, 2b and 2c are sectional views of one of the cups of the acoustic data coupler at FIG. 1 taken at section 2a—2a thereof;

FIG. 3 illustrates another acoustic data coupler having coupling cups according to another particular design;

FIG. 4 is a top view of one of the coupling cups of FIG. 3;

FIG. 5 is a cross-sectional view of one of the coupling cups of the coupler of FIG. 3 taken across section 5—5 thereof;

FIG. 6 is a partially cut away and sectional view of the other coupling cup of the coupler of FIG. 3 taken across section 6—6 thereof;

FIGS. 7a and 7b show in further sectional view the acoustical cup of FIG. 6 with handsets of widely varying sizes held thereby;

FIG. 8 is a side view of the acoustic coupler of FIG. 1 with cup position adjusting plates added; and FIG. 9 is a cross-sectional view of the modification of FIG. 8 taken at section 9—9 of FIG. 8

DESCRIPTION OF THE PREFERRED EMBODIMENT

Referring to FIG. 1, an acoustic data coupler instrument 11 contains on one side surface thereof a receiver coupling cup 13 and a transmitter coupling cup 15 spaced apart in a manner to receive an ordinary telephone handset 17 illustrated in dotted outline. The side of the data coupler 11 on which the coupling cups 13 and 15 are installed is substantially vertical.

Referring to FIG. 2a, the cup 13 is described. The cup 13 is a single unitary element molded from a rubber-like plastic material. A wall portion 19 is generally circular and is made thick enough to be fairly rigid and stay in substantially one place with respect to the case 11 to which it attaches in a circular groove 21 extending around the outside of the cup 13 and its wall 19. The wall portion 19 is angularly shaped so that the cups can be installed on a flat surface. This is made possible by the wall portion 19 holding the transducer at an angle with respect to the cover 11.

A circular base 23 of the cup 19 carries a generally circular receiving transducer element 25, shown in dotted outline in FIGS. 2a, 2b and 2c. The base portion 23 is made of thick material and thus is relatively stiff. The circular base 23 is permitted some degree of movement within a circular opening 27 provided at the bottom of the walled portion 19. The base portion 23 is connected to the walled portion 19 by a thinner molded resilient fold 29 that bridges the gap between the elements 23 and 19. As is shown in dotted outline in FIG. 2a, the base portion 23 is thus permitted to be pushed downward with respect to the side portions 19. This occurs when a telephone handset element of sufficient size is placed into a central cavity 31 of the cup 13. This assures a close physical contact and improved acoustical coupling between the handset and the element 25 since the fold 29 resiliently urges the element 25 upwards against the handset.

At the top of the generally circular side wall portion 19 and extending inward thereof is a thin, flexible circular lip 33 extending part way across the open cavity 31 to form a circular opening therethrough. The diameter of the circular opening 35 is chosen to be smaller than the outside diameter of the telephone handset portion designed to be fit thereinto.

Referring to FIG. 2b, the operation of the lip 33 is illustrated when a receiving end of the handset 17 is placed through the opening 35 into the cavity 31. The circular edge of the lip 33 forming the opening 35 stretches radially outward as the handset is pushed therethrough, forms a tight frictional engagement with the handset and rolls downward into the cavity 31 as the handset 17 is pushed further thereinto, as shown in FIG. 2b. The depth of the cavity 31 is made sufficient, and the diameter of the opening 35 cooperatively sized, all relative to the diameter of the end of the handset 17, so that the lip so rolls downward as shown in FIG. 2b when the handset is inserted.

The advantages of the lip 33 are shown with reference to FIG. 2c where the handset 17 is shown to be partially withdrawn from the cavity 31. The elastic gripping force of the lip 33 still holds when the handset 17 is partially withdrawn as shown in FIG. 2c. Because of the roll of the lip 33, as there shown, the force of the lip 33 tends to pull the handset 17 backward into the cavity 31. Only when sufficient force is applied to the handset 17 to withdraw it even further from the cavity 31 does this positive engagement with the lip 33 break. This has the advantage that the handset 17 is held firmly in place, thus making it possible to place it on the side of an instrument as shown in FIG. 1 or even on the bottom of an instrument if desired. It has the further advantage of firmly holding the handset 17 into the cup 13 in close contact with the receiving element 25 of the acoustic data coupler 11.

Referring to all of FIGS. 2a, 2b and 2c, a thin, flexible flange 37 is provided on the inside of the walls 19 extending into the cavity 31 a short distance to form yet another circular opening through which a handset, such as the handset 17, may tightly fit as best shown in FIG. 2b. This second flange provides an additional amount of acoustic isolation of the coupling between the receiver 25 and the handset 17 from external noise surrounding the data coupler 11.

The receiving cup 13 has been described. The transmitter cup 15 is preferably of essentially the same design. As an alternative to this, it will be understood that only one of the cups 13 and 15 need have structure described with respect to FIGS. 2a, 2b and 2c for some applications. The other cup could be of a conventional existing design.

Referring to FIG. 3, another data coupler 50 contains a receiver coupling cup 51 and a transmitter cup 53. These cups are mounted on housing surfaces 55 and 57, respectively, which are angularly displaced with respect to a flat top housing surface 59. A handset 61, shown in dotted outline, is positioned in both of the cups 51 and 53.

In order to accommodate a widely varying set of telephone handset sizes and shapes, the cups 51 and 53 are provided with additional adjustments that the cups described above with respect to FIGS. 1 and 2 do not contain. Referring to FIG. 4, one of these additional adjustment features is illustrated by a top view of the cup 53, although the same can be said for the cup 51. The cup 53 has a flange 63 upon which are formed numbers around its circumference. An arrow 65 is attached to the flat surface 59 of the acoustic data coupler 51. The cup 53 is attached to the coupler 51 in a manner that a telephone handset receiving opening 35' and a lip 33' moves laterally with respect to the other acoustic cup 51 when the acoustic cup 53 is rotated. The arrow 65 and the numbers on the cup flange 63 provide an indication of its rotatable position and thus also of the lateral position of the opening 35'. The range of lateral positions is shown in FIG. 4 in dotted outline, havig a maximum lateral displacement indicated by the distance 67 of FIG. 4.

The particular structure of the receiver acoustical cup 53 can be observed from the sectional view of FIG. 5, wherein components and elements thereof having the same structure, function and operation as other elements of embodiments described earlier are given the same reference number with a prime (') or double prime (") added thereto in order that a repeated description of their operation can be avoided. All of the shapes and elements of the cup 51 shown in FIG. 5 and to be described are made from a single continuous molded element.

A base flange 69, carrying the rotational numbers on its top surface 63', is attached in a circular slot 71 to the portion 57 of the data coupler 51. The rest of the cup 51 is attached thereto by a resilient lip 73 made of thinner material than is the base portion 69 or most of the remaining portions of the cup 51, as is quite apparent from the sectional view of FIG. 5. The curved nature of the lip 73 allows it to be stretched straight in some areas while at the same time to be given a higher degree of curvature in other areas. This capability thus makes it possible to tilt the top part of the cup 51 with respect to the base 69 and thus with respect to the cover of the acoustic coupler 51. Arrows 70 indicate this motion.

This provides additional flexibility in receiving telephone handsets of various sizes.

Although not shown in FIG. 5, a transmitter element is positioned within the cup 51 at a lower depression 75. It is covered by a screen 77 shown in dotted outline in FIG. 5.

Referring to FIG. 6, the receiver cup 51 is shown. It is constructed generally the same as the transmitting cup 53, so similar components thereof are given the same reference numbers with a prime (') added. The lip 33" and opening 35" cooperate with a telephone handset in the same manner as the elements 33 and 35 as previously explained with respect to FIGS. 1 and 2. The slot 71' and the base 69' of the cup 53 is made eccentric to the opening 35". That is, the center of the circular slot 71' is displaced a lateral distance with respect to the center of the circular opening 35". The centers are displaced a lateral distance in a direction toward or away from the centers of the other acoustical cup 53, thereby converting rotary motion of the cup 53 into axial displacement of its opening 35' in a lateral direction toward or away from the other acoustical cup 51.

Referring to FIGS. 7a and 7b, the receiving cup 51 is shown with a receiving transducer element 81 therein. Also illustrated are the extreme dimensions of a receiver end of a telephone handset that can be utilized with the particular lip structure that has been described herein. The cup embodiment of FIGS. 3–7 is preferable for use in European countires where the handsets vary considerably in size. The acoustic cup illustrated with respect to FIGS. 1 and 2 is less flexible in the variation of handset sizes that it can handle but is satisfactory for markets in the United States and Canada.

The acoustic cup of FIGS. 1 and 2 is preferred for use with high data rate transmission. For high rates, the handset transducer and the cup transducer must be in very close contact and the cup must be designed to exclude extraneous noise from interfering with the acoustical coupling between these elements. In order to accommodate handsets having varying distances between the transmitter and receiver, but with substantially the same angular relationship, such as is found in the countries on the European continent, the acoustical coupler structure of FIGS. 1 and 2 is modified as shown in FIGS. 8 and 9. The reference characters of FIGS. 1 and 2 are used, where appropriate, in the modification shown in FIGS. 8 and 9, but with a prime (') added thereto.

Referring to FIG. 8, acoustical cups 13' and 15' are not mounted directly onto a side panel 101 of the acoustical data coupler instrument case 11', but rather they are attached to individual mounting plates 103 and 105, respectively. As shown in FIG. 9, the cups are mounted within an opening in the side wall 101 that is large enough to accommodate lateral motion of the cup and plate with respect to the case wall, this space indicated at 107 in FIG. 9 with respect to the cup 13'. Each of the plates is movable from the position shown in FIG. 8 to that indicated in dotted outline by loosening four mounting screws.

One such screw 111 is shown in sectional view in FIG. 9. It is inserted into a hole 109 of the side wall 101 and is fastened with the aid of a locking nut 113. The opening 109 is large enough to permit the screw 111 to slide back and forth the desired movement distance of the cup 13'. Thus, acoustic modems to be used in a particular country having a specific and perhaps unique distance between the receiver and transmitter of telephone handsets may be adjusted for that specific distance either upon manufacturing or by the user. In either case, the mounting screws for the plates 103 and 105 are firmly fastened to the side wall 101.

The cup 13' has a fixed angle between its supporting plate 103 and a transducer carried by the cup. If handsets with an angle that differs much from that angle are to be used, different cups need to be provided with that different angle. Thus, close contact between the transducer and the cup 13' and that of the handset is maintained. The transmitter and receiver housing diameters may vary within a significant range and still be accommodated by the opening and elastic lip on the outside of the cup 13', as discussed previously with respect to the other embodiments of the acoustical cups.

It will be recognized that the various features described herein with respect to its preferred embodiments can be combined in other ways than those particular examples shown and described herein. For example, only one of a pair of acoustical cups need have the telephone handset gripping lip feature described initially with respect to FIGS. 1 and 2. As another example, the rotatable and bendable acoustical cup described with respect to FIGS. 3–7 may be used as only one of the acoustical cups with some other type being used as the other in a given acoustical data coupler. Therefore, even though the various aspects of the present invention have been described with respect to its preferred embodiments, it will be understood that the invention is entitled to protection within the full scope of the appended claims.

I claim:

1. In an acoustic data coupler having a case and two acoustic coupling cups carried by said case and spaced apart for accepting receiver and transmitter portions of a telephone handset, one of said cups containing a telephone receiving transducer and the other of said cups a telephone transmitter transducer, at least one of said cups comprising a thin flexible lip extending inward of a more rigid circular support extending upward from the case, said lip terminating in a circular opening having a given diameter, the mechanical characteristics of the lip being such that when a telephone handset receiver or transmitter having a diameter larger than said given diameter is forced inward through the cup opening the internal circular edge of said lip stretches outwardly firmly gripping the handset transmitter or receiver and moves inward therewith from the lip as the receiver or transmitter is urged inward to a rest position, thereby causing a roll in said lip which provides a force tending to pull the telephone handset into said cup and against said telephone transducer, whereby good quality acoustical coupling is provided between the handset receiver or transmitter and the cup transducer, and wherein said at least one of said cups is mounted on a plate, said plate being adjustable with respect to said case in a direction toward and away from the other of said two acoustic coupling cups.

2. An acoustical data coupler, comprising:
   a case,
   two spaced-apart acoustic cups carried by said case, at least one of said acoustic cups being formed of a unitary molded structure, comprising:
   a base portion adapted to be held by said case and having a circular opening therein,
   means adapted to freely move within said base portion for carrying a telephone transducer, a thin, flexible resilient fold joining said transducer carrying means with the bottom of said base portion in a manner to resiliently urge said transducer carrying means upward within said base and said at least one of said cups being mounted on a plate, said plate being adjustable with respect to said case in a direction toward and away from the other of said two acoustic coupling cups.

3. The data coupler according to claim 2 wherein said base portion includes a thin flexible annular flange extending inward thereof adjacent the position of said telephone transducer whereby an acoustic seal is formed with a telephone handset inserted into said at least one acoustic cup.

4. The data coupler according to claim 2 wherein said base portion includes at its said circular opening a thin flexible lip extending inward and terminating in a circular opening having a given diameter, the mechanical characterisitcs of the lip being such that when a telephone handset receiver or transmitter having a diameter larger than said given diameter is forced inward into the base portion the internal circular edge of said lip stretches outwardly, firmly gripping the handset transmitter or receiver, thereby to form an acoustic seal.

* * * * *